US009837830B2

(12) United States Patent
Yun et al.

(10) Patent No.: US 9,837,830 B2
(45) Date of Patent: Dec. 5, 2017

(54) WIRELESS POWER TRANSMITTING METHOD AND APPARATUS USING DUAL-LOOP IN-PHASE FEEDING

(71) Applicant: Electronics and Telecommunications Research Institute, Daejeon (KR)

(72) Inventors: Je Hoon Yun, Daejeon (KR); Seong Min Kim, Daejeon (KR); Jung Ick Moon, Daejeon (KR); In Kui Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 325 days.

(21) Appl. No.: 14/696,562

(22) Filed: Apr. 27, 2015

(65) Prior Publication Data

US 2015/0311728 A1    Oct. 29, 2015

(30) Foreign Application Priority Data

Apr. 25, 2014 (KR) ................. 10-2014-0049660
Apr. 14, 2015 (KR) ................. 10-2015-0052562

(51) Int. Cl.
   *H01F 27/42*    (2006.01)
   *H02J 5/00*    (2016.01)
   (Continued)

(52) U.S. Cl.
   CPC .............. *H02J 5/005* (2013.01); *H01F 38/14* (2013.01); *H02J 7/025* (2013.01); *H02J 50/10* (2016.02); *H02J 50/12* (2016.02)

(58) Field of Classification Search
   None
   See application file for complete search history.

(56) References Cited

U.S. PATENT DOCUMENTS

2009/0058189 A1\* 3/2009 Cook ................... H04B 5/0037
                                                                  307/104
2011/0304216 A1   12/2011 Baarman
                    (Continued)

FOREIGN PATENT DOCUMENTS

KR    1020120124646 A    11/2012
KR    1020130099576 A     9/2013
KR    1020130111832 A    10/2013

OTHER PUBLICATIONS

Qiaowei Yuan et al., Numerical Analysis on Transmission Efficiency of Evanescent Resonant Coupling Wireless Power Transfer System, IEEE Transactions of Antennas and Propagation, May 2010, pp. 1751-1758, vol. 58 No. 5, IEEE.

*Primary Examiner* — Tuan T Lam
(74) *Attorney, Agent, or Firm* — William Park & Associates Ltd.

(57) ABSTRACT

Provided are wireless power transmitting method and apparatus using dual-loop in-phase feeding. The wireless power transmitting apparatus includes a generator configured to generate a Radio Frequency (RF) signal, an amplifier configured to amplify the generated RF signal, a matching circuit configured to be connected to the amplifier to perform impedance matching, a first resonator configured to comprise a first feeding loop connected to the matching circuit and transmit wireless power using a signal provided through the first feeding loop, and a second resonator configured to comprise a second feeding loop connected to the matching circuit and transmit wireless power using a signal provided through the second feeding loop, wherein the first and second feeding loops are formed in a manner that allows magnetic fields respectively generated by the first and second resonators to be excited in the same direction and in phase.

20 Claims, 11 Drawing Sheets

(51) Int. Cl.
    *H02J 50/12*    (2016.01)
    *H02J 50/10*    (2016.01)
    *H02J 7/02*     (2016.01)
    *H01F 38/14*    (2006.01)

(56) References Cited

U.S. PATENT DOCUMENTS

| | | | |
|---|---|---|---|
| 2012/0112554 A1* | 5/2012 | Kim | H02J 5/005 |
| | | | 307/104 |
| 2012/0133214 A1* | 5/2012 | Yun | H03H 3/00 |
| | | | 307/104 |
| 2012/0161539 A1* | 6/2012 | Kim | H02J 17/00 |
| | | | 307/104 |
| 2013/0046456 A1* | 2/2013 | Scofield | G01C 21/3423 |
| | | | 701/117 |
| 2013/0181541 A1 | 7/2013 | Karalis et al. | |
| 2013/0221757 A1 | 8/2013 | Cho et al. | |
| 2013/0257173 A1 | 10/2013 | Saitoh | |
| 2013/0293025 A1 | 11/2013 | Xu et al. | |
| 2014/0008974 A1* | 1/2014 | Miyamoto | H02J 5/005 |
| | | | 307/11 |

* cited by examiner

WIRELESS POWER TRANSMITTING METHOD AND APPARATUS USING DUAL-LOOP IN-PHASE FEEDING

Priority to Korean patent application number 2014-0049660 filed on Apr. 25, 2014, and 2015-0052562 filed on Apr. 14, 2015, the entire disclosure of which is incorporated by reference herein, is claimed.

BACKGROUND OF THE INVENTION

Field of the Invention

The present invention relates to a wireless power transmitting method and apparatus using dual-loop in-phase feeding to expand a receiving space and improve power transmission efficiency of a wireless power transmitting system.

Related Art

A technology of expanding a receiving space with high power efficiency is important for wireless power transmission. It is because a receiving space with high power efficiency can provide autonomy in position to a receiver, and address low power transmission efficiency that results from position error between a transmitting coil and a receiving coil.

The existing wireless power transmitting system employs a single feeding method in which a transmitter includes a single resonant coil and a receiver includes a single resonant coil. To solve this drawback, there has been proposed Korean Patent Publication No. 10-2013-0099576 (Published on Sep. 6, 2013), which relates to a wireless power transmission apparatus including a transmission feeding loop, a transmitter resonator configured to receive and transmit impedance matching and power using the transmission feeding loop, a relay resonator configured to have a resonant frequency identical with that of the transmitter resonator and store energy in a specific space by generating mutual resonance through a resonance characteristic with the transmitter resonator, and one or more reception resonators configured to receive the energy stored in the specific space.

However, the above-mentioned wireless power transmitting apparatus employs a dual-loop single feeding method by installing two transmitting resonant coils on both sides of a receiving resonant coil, wherein one of the two transmitting resonant coils has a shorted feeding loop and the other transmitting resonant coil has a normal feeding loop. In this case, if the two transmitting resonant coils are installed at great distance from each other, a receiving resonant coil is excited by one transmitting resonant coil having a feeding loop, and then the receiving resonant coil causes the other transmitting resonant coil, which is installed on the opposite direction and has a shorted loop, to be excited. Due to the sequential excitation, if the receiving resonant coil is positioned closer to a transmitting resonant coil having a shorted feeding loop, power transmission efficiency may be significantly reduced. It means the above-mentioned wireless power transmission apparatus have restraints of a receiving space.

SUMMARY OF THE INVENTION

The present invention provides a wireless power transmitting method using dual-loop in-phase feeding to provide a much wider receiving space with high transmission efficiency.

The present invention also provides a wireless power transmitting apparatus using dual-loop in-phase feeding to provide a much wider receiving space with high transmission efficiency.

In an aspect, there is provided a wireless power transmitting apparatus including a generator configured to generate a Radio Frequency (RF) signal, an amplifier configured to amplify the generated RF signal, a matching circuit configured to be connected to the amplifier to perform impedance matching, a first resonator configured to comprise a first feeding loop connected to the matching circuit and transmit wireless power using a signal provided through the first feeding loop, and a second resonator configured to comprise a second feeding loop connected to the matching circuit and transmit wireless power using a signal provided through the second feeding loop, wherein the first and second feeding loops are formed in a manner that allows magnetic fields respectively generated by the first and second resonators to be excited in the same direction and in phase.

Current may flow on the same direction in the first and second feeding loops.

A charging area may be formed between the first and second resonators.

The first and second resonators may be connected to the matching circuit in parallel, and the first and second feeding loops may be at the same distance from a point where an RF signal is separated to be provided to each of the first and second feeding loops.

The first and second resonators and the matching circuit may be connected to one another using a "T"-shaped connector.

The first and second resonators may be connected to the matching circuit in serial.

At least one of the first and second resonators may include a resonant coil.

The wireless power transmitting apparatus may further include a controller configured to control, based on information received from a wireless power receiving apparatus, a magnitude of wireless power to be transmitted to each of the first and second resonators.

In another aspect, there is provided a wireless power transmitting method which is implemented by a wireless power transmitting apparatus, the method which includes generating a Radio Frequency (RF) signal, amplifying the generated RF signal, performing impedance matching on the amplified signal, providing a resultant signal to a first resonator using a first feeding loop and to a second resonator using a second feeding loop, and transmitting wireless power to a wireless power receiving apparatus by using the first and second resonators, wherein the first and second feeding loops are formed in a manner that allow magnetic fields respectively generated by the first and second resonators to be excited in the same direction and in phase.

Current may flow in the same direction in the first and second feeding loops.

A charging area may be formed between the first and second resonators.

The first and second resonators may be connected in parallel to a matching circuit that performs the impedance matching, and the first and second feeding loops may be at the same distance from a point where an RF signal is separated to be provided to each of the first and second feeding loops.

The first and second resonators and the matching circuit may be connected to one another using a "T"-shaped connector.

The first and second resonators may be connected in serial to a matching circuit that performs the impedance matching.

At least one of the first and second resonators may include s a resonant coil.

The wireless power transmitting method may further include controlling, based on information received from a wireless power receiving apparatus, a magnitude of wireless power transmitted from each of the first and second resonators.

In yet another aspect, there is provided a wireless power receiving apparatus including a plurality of resonators, each configured to receive wireless power from a wireless power transmitting apparatus based on magnetic resonance, a matching circuit configured to be connected to the plurality of resonators to perform impedance matching, and a rectifier configured to rectify current input through the matching circuit, wherein the plurality of resonators are formed in a manner that allows magnetic fields respectively generated by the plurality of resonators to be excited in the same direction and in phase.

Current may flow in the same direction in the plurality of resonators.

The plurality of resonators may be connected in parallel to the matching circuit, and cables connecting the matching circuit to each of the plurality of resonators may have the same length.

The plurality of resonators may be connected to the matching circuit in serial.

DESCRIPTION OF EXEMPLARY EMBODIMENTS

Figure 1:
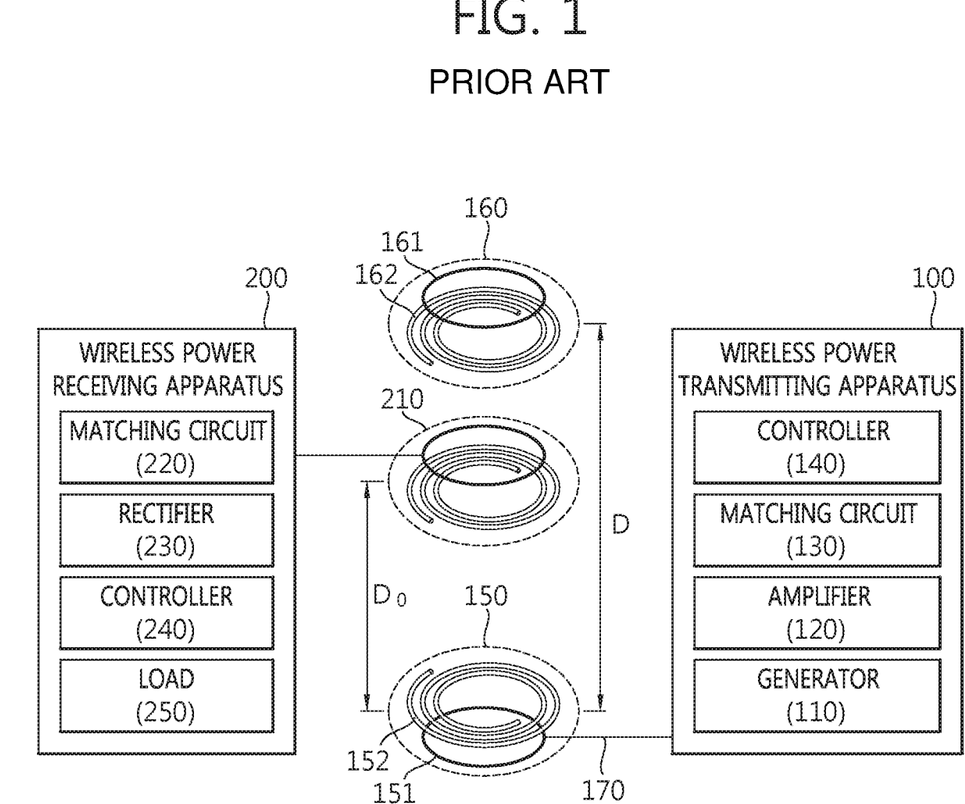
FIG. 1 is a block diagram illustrating a wireless power transmitting system using existing dual-loop single feeding according to an exemplary embodiment.
Figure 2:
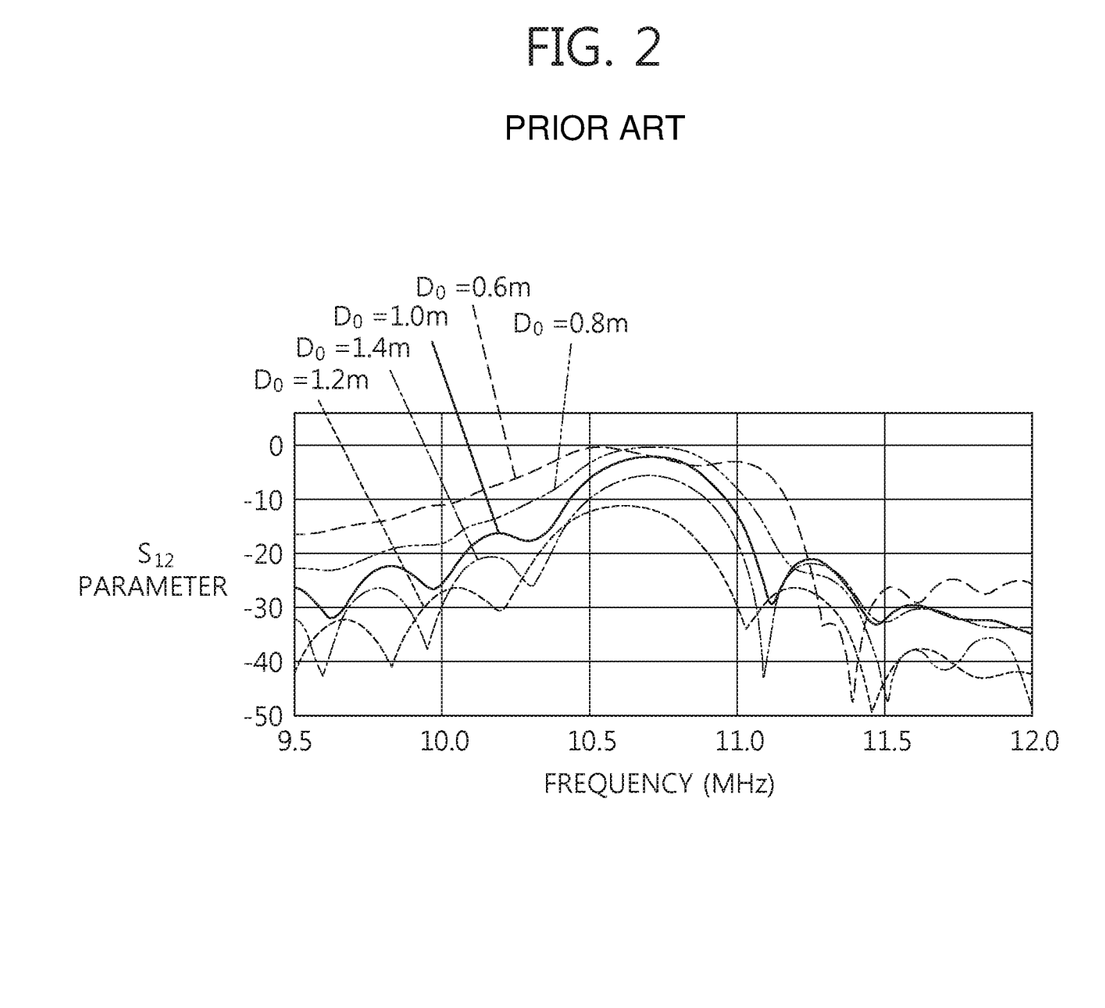
FIG. 2 is a graph showing power transmission efficiency according to a position of a receiver coil in the case of using dual-loop single feeding.

FIG. 1 is a block diagram illustrating a wireless power transmitting system using existing dual-loop single feeding, and FIG. 2 is a graph showing power transmission efficiency according to a position of a receiver coil in the case of using dual-loop single feeding.

As shown in FIG. 1, a wireless power transmitting system generally includes a wireless power transmitting apparatus 100 and a wireless power receiving apparatus 200. Throughout the following descriptions, the term "wireless power" may indicate power that is transmitted wirelessly.

The wireless power transmitting apparatus 100 includes a generator 100 configured to generate a wireless signal, an amplifier 120 configured to amplify the wireless signal generated by the generator 110, a matching circuit configured to perform impedance matching so as to enhance efficiency in transferring wireless power amplified by the amplifier, a controller configured to exchange, with the wireless power receiving apparatus 200, information on whether the wireless power receiving apparatus 200 is properly provided with power or information on a magnitude of power that the wireless power receiving apparatus 200 needs, and transmitting elements 150 and 160, each configured to radiate wireless power into a space. The wireless signal may be called a Radio Frequency (RF) signal, a power signal, or the like.

The wireless power receiving apparatus 200 may include a receiving element 210 configured to receive wireless power in the space, a matching circuit 220 configured to perform impedance matching to improve efficiency in transmitting wireless power, a rectifier 230 configured to rectify the received wireless power, a controller 240 configured to exchange information with the wireless power transmitting apparatus 100 and control power that is to be provided to a load 250, and the load 250 configured to use power received from the wireless power transmitting apparatus 100.

Regarding the wireless power transmitting system, the "dual-loop single feeding method" illustrated in FIG. 1 is implemented as in the following. The first transmitting element 150 includes a feeding loop 151 and a transmitting resonant coil 152, while the second transmitting element 160 includes a feeding loop 161 and a transmitting resonant coil 162, the feeding loop 151 of the transmitting element 150 performs feeding through the cable 170 so as to transmit power provided from the wireless power transmitting apparatus 100, and the feeding loop 161 of the second transmitting element 160 is shorted. In addition, the first and second transmitting elements 150 and 160 are installed at a specific distance D from each other, and the receiving element 210 is able to receive wireless power in a charge area formed between the transmitting elements 150 and 160. However, in this configuration, if the receiving element 210 approaches close to the first transmitting element 160 (that is, if a value of gap between $D_0$ and D is close to 0), strength of a magnetic field excited by the transmitting resonant coil 152 provided with power is reduced, so that impedance matching is unable to be performed.

FIG. 2 illustrates a S12 parameter at frequencies, wherein the S12 parameter represents power transmission characteristics according to a separation distance $D_0$ between the transmitting resonant coil 152 provided with power and a receiving resonant coil. FIG. 2 shows power transmission characteristics in a case where a distance D between the transmitting resonant coil 152 and the receiving resonant coil, that is, a length of a space where the transmitting resonant coil 152 is able to be placed, is 2 meters. Referring to FIG. 2, if the separation distance $D_0$ between the transmitting resonant coil 152 from the receiving resonant coil is 0.8 m or greater, transmitting and receiving characteristics may be degraded. Specifically, in a case where a magnetic field generated by the transmitting resonant coil 152 provided with power excites the receiving resonant coil and then a magnetic field generated by the receiving resonant coil excites the transmitting resonant coil 162 which is shorted, strength of a magnetic field in an area where the receiving resonant coil is positioned is dramatically reduced, so that the magnetic field generated by the transmitting resonant coil 152 fails to excite the receiving resonant coil sufficiently.

To solve these drawbacks, there has been proposed a method in which the two transmitting resonant coils 152 and 162 are provided with power simultaneously. In this method, an RF switch is installed, a receiving state of a receiving resonant coil is checked by exciting the first transmitting resonant coil 152, and then a receiving state of the receiving resonant coil is checked by exciting the second transmitting resonant coil 162. Information on the receipt state of the first and second transmitting resonant coils 152 and 162, respectively, is transmitted to the wireless power receiving apparatus 200, so that power is provided to one transmitting resonant coil positioned in a direction from which the greatest power is received, while the other transmitting resonant coil positioned in the opposite direction is shorted. However, this method may cause great power loss that occurs during a switching operation. Therefore, to prevent the power loss, the present invention provides a wireless power transmission method using "dual-loop in-phase feeding." The term "in phase" indicates that a magnetic field maintains in phase characteristics in an area between feeding loops.

Figure 3:
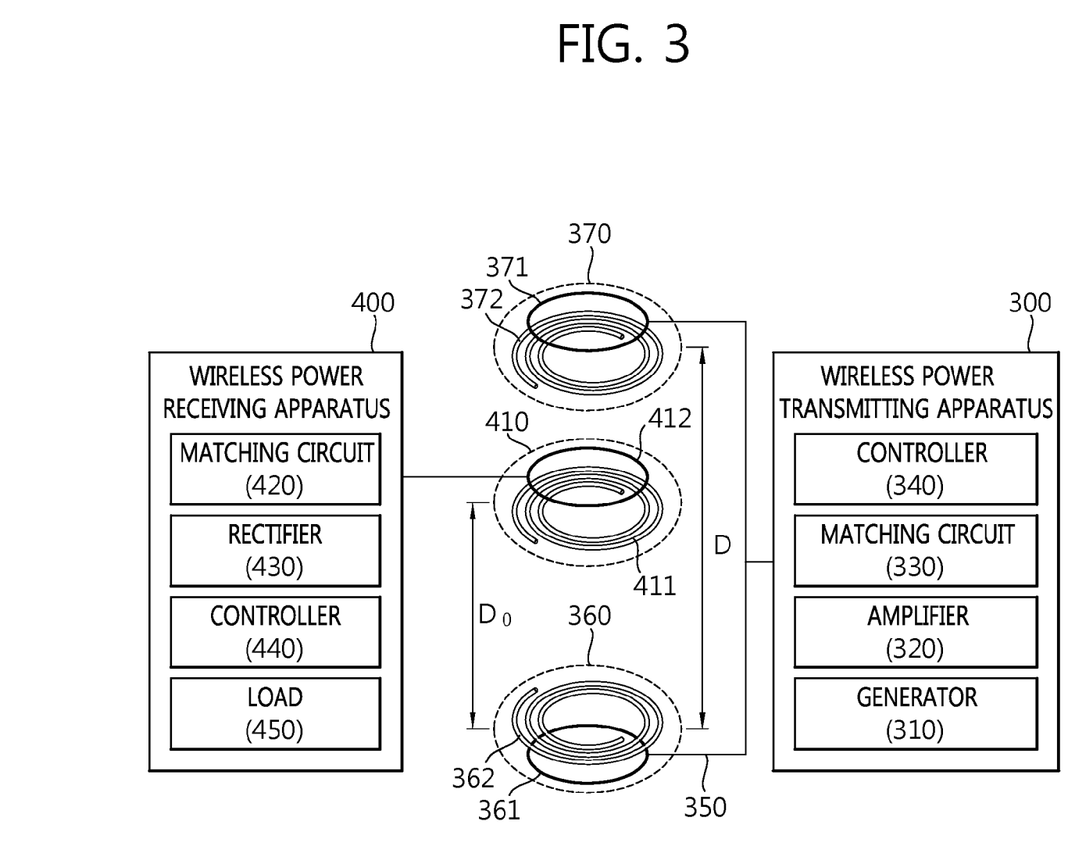
FIG. 3 is a block diagram illustrating a wireless power transmitting system using dual-loop in-phase feeding according to an exemplary embodiment of the present invention.

FIG. 3 is a block diagram illustrating a wireless power transmitting system using dual-loop in-phase feeding according to an exemplary embodiment of the present invention.

Referring to FIG. 3, a wireless power transmitting system includes a wireless power transmitting apparatus 300 and a wireless power receiving apparatus 400.

The wireless power transmitting apparatus 30 may include a generator 310, an amplifier 320, a matching circuit 330, a controller 340, and a plurality of resonators 360 and 370. The following description hereinafter provided relates to a case in which the wireless power transmitting apparatus 300 includes two resonators (the first resonator 360 and the second resonator 3670), as illustrated in FIG. 3. However, the wireless power transmitting apparatus 300 may include a plurality of resonators, if necessary.

The generator 310 generates a Radio Frequency (RF) signal. The RF signal may be called a wireless signal, a power signal, or the like.

The amplifier 320 amplifies the RF signal generated by the generator 310.

The matching circuit 330 is provided in an effort to improve efficiency in transmitting wireless power amplified by the amplifier 320. The matching circuit 330 is connected to the amplifier 320 to perform impedance matching. For example, the matching circuit 330 may be a variable capacitor, a parallel capacitor, an inductance circuit, and the like. For the impedance matching, the matching circuit 330 may adjust a resonance frequency or may adjust capacitance with a fixed resonance frequency.

Based on information received from the wireless power receiving apparatus 400, the controller 340 controls a magnitude of wireless power transmitted from the first and second resonators 360 and 370. To this end, the controller 340 may exchange various kinds of information with the wireless power receiving apparatus 400 through in-band or out-band communications. Examples of the information exchanged between the wireless power transmitting apparatus 300 and the wireless power receiving apparatus 400 include information on a capability of a corresponding apparatus, unique identification information, state-of-charge information, and charge control information. In addition, based on a predetermined signal, the controller 340 is able to detect the approach of the wireless power receiving apparatus 400 and whether any foreign substance exists in a charging area.

The first resonator 360 includes a first feeding loop 361 connected to the matching circuit 330 through a cable 350. The first resonator 360 transmits wireless power to the wireless power receiving apparatus 400 using a signal provided through the first feeding loop 361.

The second resonator 370 includes a second feeding loop 371 connected to the matching circuit 330 through the cable 350. Similar to the first resonator 360, the second resonator 370 transmits wireless power to the wireless power receiving apparatus 400 using a signal provided through the second feeding loop 371.

The first resonator 360 and the second resonator 370 may selectively include resonant coils 361 and 371, respectively. Each of the first resonator 360 and the second resonator 370 may have a charging area formed therein.

The cable 350 is provided in an effort to transmit power generated in the wireless power transmitting apparatus 300 to each feeding loop (or each resonant coil). The cable 350 may be separated into two cables, and one separated cable is connected to the first feeding loop 361, while the other separated cable is connected to the second feeding loop 371. In this case, the separated cables may have the same length. To cause power to be separated in phase at a point where the cable 350 is separated, the cable 350 is connected to each of the feeding loops 361 and 371, so that the first and second feeding loops 361 and 371 may be provided with power in phase. In addition, the first and second feeding loops 361 and 371 are formed in a manner that allows magnetic fields respectively generated by the resonators 360 and 370 to be excited in the same direction and in phase in an area where a receiver resonator (that is, a resonator of the wireless power receiving apparatus) is positioned. To this end, current may flow in the same direction in the first and second feeding loops 361 and 371.

For example, the first and second resonator 360 and 370 may be connected to the matching circuit 330 in parallel or in serial. In the case of in-parallel connection, the first and second feeding loops 371 and 372 are at the same distance from a point where an RF signal is separated to be provided to the first and second feeding loops 371 and 372. In a case where the first and second resonators 360 and 370 are connected to the matching circuit 330 in parallel through a coaxial cable, the first and second resonators 360 and 370 and the matching circuit 330 may be connected to one another using a "T"-shaped connector.

Due to the aforementioned configuration the wireless power transmitting apparatus 300 according to an exemplary embodiment, power transmitted to the resonator 360 and the resonator 370 may change depending on whether the receiver resonator 410 is positioned between the transmitter resonators 360 and 370. That is, if the receiver resonator 410 approaches close to the first transmitter resonator 360 (that is, if a separation distance $D_0$ is close to 0), the first transmitter resonator 360 automatically transmits greater power than the second transmitter resonator 370. Alternatively, if the receiver resonator 410 approaches close to the second transmitter resonator 370 (that is, if a separation distance $D_0$ is close to D), the second transmitter resonator 370 automatically transmits greater power than the first transmitter resonator 360.

Meanwhile, the wireless power receiving apparatus 400 may include at least one resonator 410, a matching circuit 420, a rectifier 430, a controller 440, and a load 450.

The resonator 410 receives wireless power from the wireless power transmitting apparatus 300 based on magnetic resonance.

The matching circuit 420 is connected to the resonator 410 to perform impedance matching. The matching circuit 420 may be a variable capacitor, a parallel capacitor, an inductance circuit, and the like. The matching circuit 420 may be positioned between the resonator 410 and the rectifier 430.

The rectifier 430 rectifies power input through the matching circuit 420. For example, the rectifier 430 may be an Alternating Current (AC)/Direct Current (DC) converter to convert AC power received through the resonator 410 into DC power to be used by the load 450.

The controller 440 exchanges information with the wireless power transmitting apparatus 300 and controls power that is to be provided to the load 450. Through in-band or out-band communications, the controller 440 may exchange, with the wireless power transmitting apparatus 300, various kinds of information that are required for power control.

The load 250 uses power received from the wireless power transmitting apparatus 300. Although being included in the wireless power receiving apparatus 400 in the example illustrated in FIG. 4, the load 450 may be connected to the wireless power receiving apparatus 400 through a Universal Serial Bus (USB), if necessary.

Figure 4:
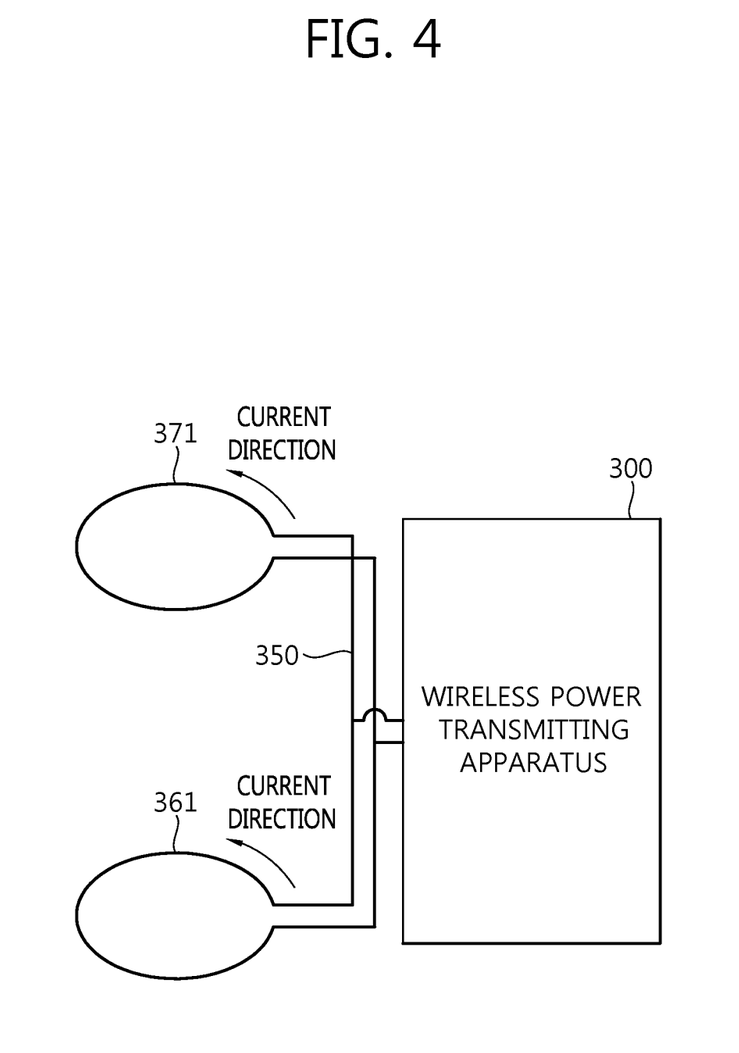
FIG. 4 is a diagram illustrating parallel dual-loop in-phase feeding according to an exemplary embodiment of the present invention.

FIG. 4 is a diagram illustrating parallel dual-loop in-phase feeding according to an exemplary embodiment of the present invention. Hereinafter, parallel dual-loop in-phase feeding is described in detail with reference to FIG. 4.

In a case of using parallel dual-loop in-phase feeding, the first and second feeding loops 361 and 371 of the wireless power transmitting apparatus 300 may be connected to each other in parallel through the cable 350. In this case, to cause magnetic fields excited in a central area (a center of a charging area) between the first and second feeding loops 361 and 371, the first and second feeding loops 361 and 371 may be provided with power such that current may flow in the same direction in the first and second feeding loops 361 and 371. In a case where a coaxial cable is used as the cable 350 for the parallel dual-loop in-phase feeding illustrated in FIG. 4, the cable 350 may be connected to each of the feeding loops 361 and 371 using a "T"-shaped connector. In addition, the first and second feeding loops 361 and 371 are at the same distance from a point where power starts to be distributed to each of the first and second feeding loops 361 and 371. In this case, it is possible to achieve the same in phase effects as long as the feeding loops 361 and 371 are installed within a specific range (−/+20°).

Figure 5:
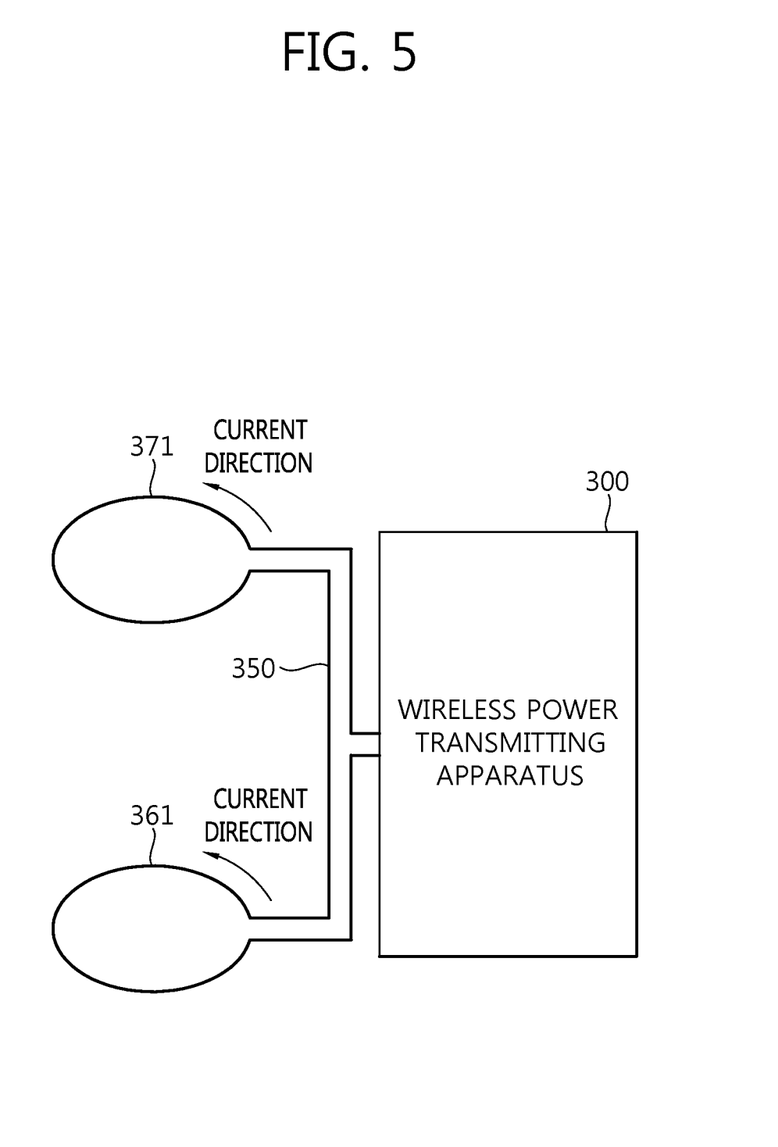
FIG. 5 is a diagram illustrating a diagram illustrating serial dual-loop in-phase feeding according to an exemplary embodiment of the present invention.

FIG. 5 is a diagram illustrating serial dual-loop in-phase feeding according to an exemplary embodiment of the present invention. Hereinafter, serial dual-loop in-phase feeding is described in detail with reference to FIG. 5.

In the case of using serial dual-loop in-phase feeding, the wireless power transmitting apparatus 300 may be connected to the first and second feeding loops 361 and 371 in serial, as illustrated in FIG. 5. Even in this case, to cause magnetic fields excited in a central area (a center of a charging area) between the first and second feeding loops 361 and 371, the feeding loops 361 and 371 may be provided with power such that current may flow in the same direction in the first and second feeding loops 361 and 371. If the first and second feeding loops 361 and 371 are configured as above, resonance may be generated regardless of whether a receiver resonator (that is, a resonator of the wireless power receiving apparatus) is positioned in any one of two transmitter resonators (resonators of the wireless power transmitting apparatus).

Figure 6:
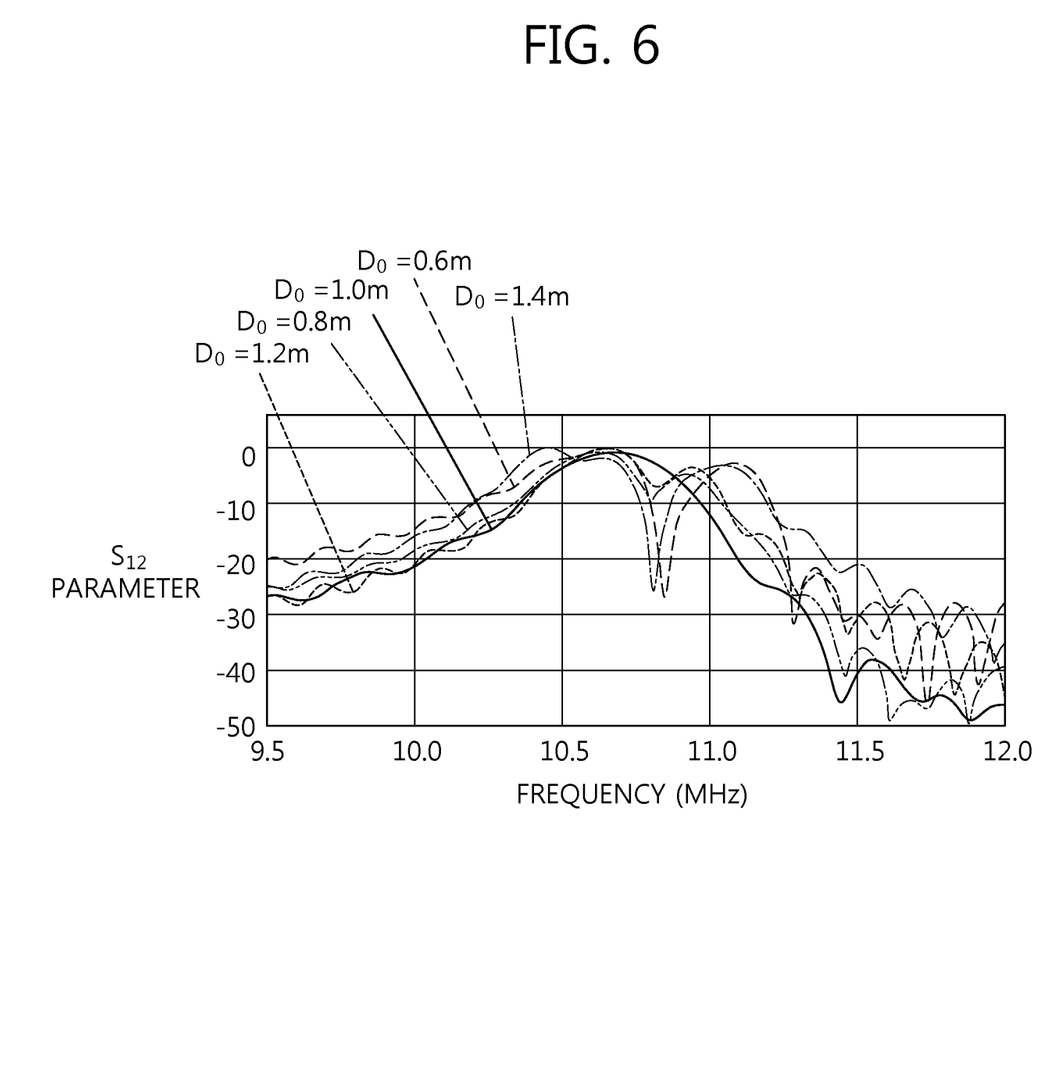
FIG. 6 is a graph illustrating power transmission efficiency according to a position of a receiver coil in the case of using dual-loop in-phase feeding according to an exemplary embodiment of the present invention.

FIG. 6 is a graph illustrating power transmission efficiency according to a position of a receiver coil in the case of using dual-loop in-phase feeding according to an exemplary embodiment.

FIG. 6 shows a S12 parameter at frequencies, the parameter which represents characteristics of power transmission according to a separation distance $D_0$ between a transmitter resonator and a receiver resonator in the case of using parallel dual-loop in-phase feeding according to an exemplary embodiment of the present invention.

Referring to FIG. 6, in a 50-ohm wireless power transmitting system where a transmission area D is 2 m and a distance between a feeding loop and a resonant coil is fixed, impedance matching is performed properly regardless of whether a receiver resonator is positioned closed to any transmitter resonator. As a result, high power transmission efficiency may be achieved. The serial dual-loop in-phase feeding has characteristics similar to those of the parallel dual-loop in-phase feeding.

Figure 7:
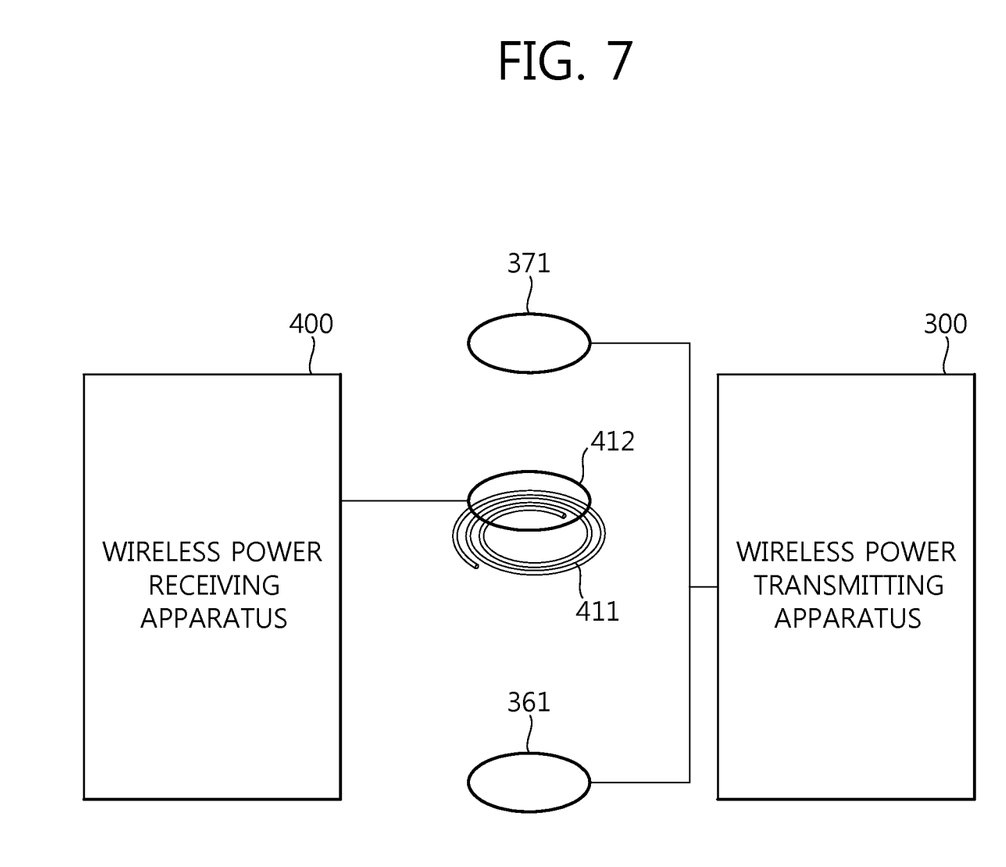
FIGS. 7, 8, and 9 are block diagrams illustrating a wireless power transmitting system using dual-loop in-phase feeding according to another exemplary embodiment of the present invention.
Figure 8:
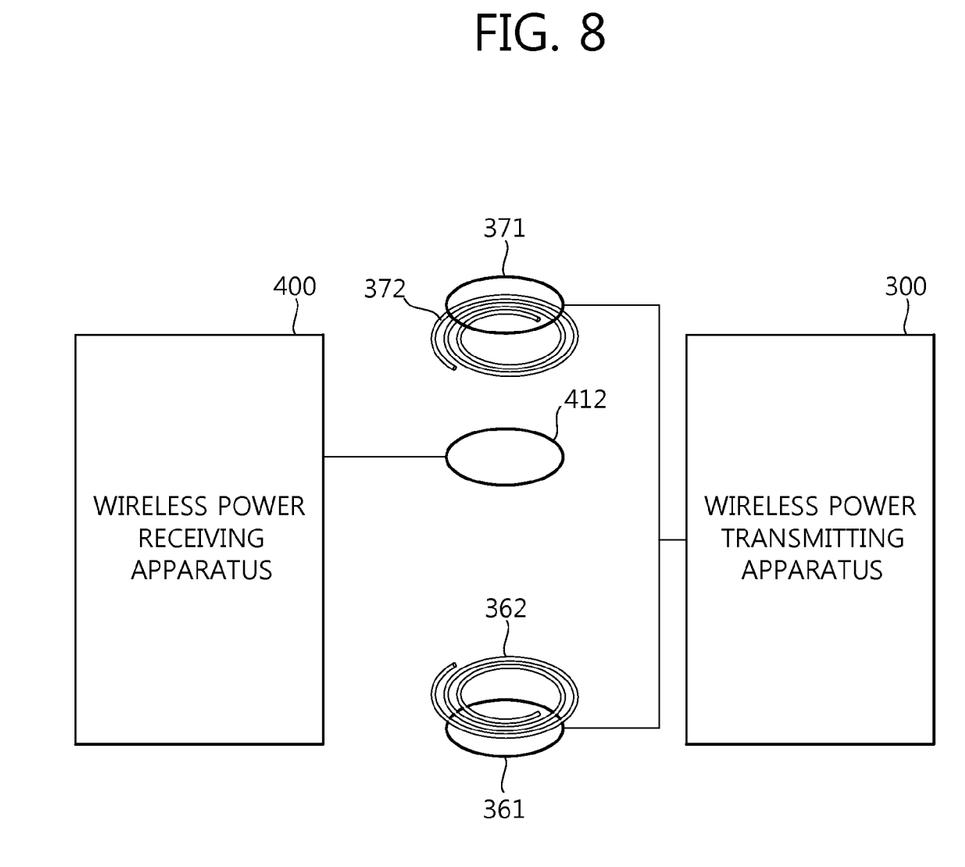
Figure 9:
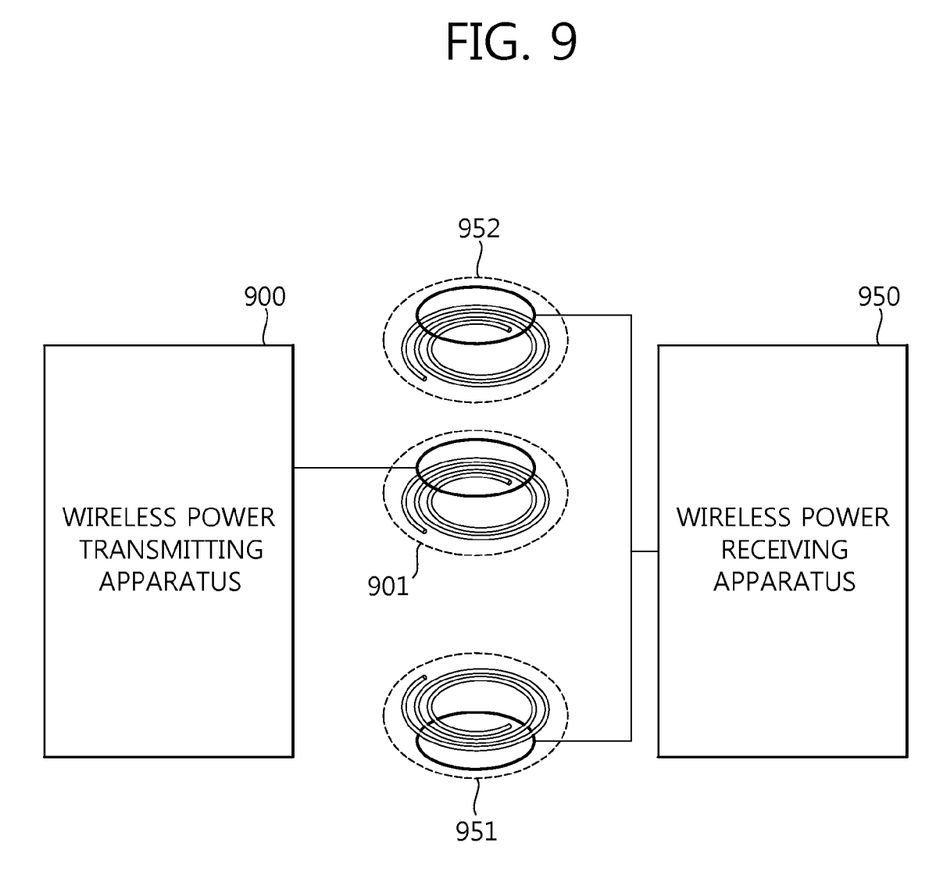

FIGS. 7, 8, and 9 are block diagrams illustrating a wireless power transmitting system using dual-loop in-phase feeding according to another exemplary embodiment of the present invention.

FIG. 7 shows a case in which a resonator of a wireless power transmitting apparatus 300 includes feeding loops 361 and 371 without a resonant coil. Even in this structure, the wireless power transmitting system using dual-loop in-phase feeding according to the present invention may achieve greater power transmission efficiency and provide a wider receiving area, compared to a wireless power transmitting system using existing dual-loop single feeding. This structure causes strength of an adjacent electric field or magnetic field to become less than that of a structure where a transmitter resonator includes a resonant coil, so that this structure is less harmful to human.

FIG. 8 shows a case where a resonator of a wireless power receiving apparatus 400 includes a feeding loop 412 without a resonant coil. Even in this structure, the wireless power transmitting system may achieve greater power transmission efficiency and provide a wider receiving area, compared to a wireless power transmitting system using existing dual-loop single feeding. In this structure, the wireless power receiving apparatus 400 does not include a resonant coil, so that it is possible to manufacture the wireless power receiving apparatus 400 to be light and thin.

FIG. 9 illustrates dual-loop in-phase feeding according to an exemplary embodiment of the present invention. In this method, a transmitter resonator and a receiver resonator may play the respective roles that are opposite to those described in the above with reference to FIG. 3. The opposite roles of the transmission and receiver resonators may be applied to the exemplary embodiments of FIGS. 4, 5, 7, and 8.

For example, according to the exemplary embodiment shown in FIG. 9, a wireless power receiving apparatus 950 may include a plurality of resonators 951 and 952, each configured to receive wireless power from a wireless power transmitting apparatus based on magnetic resonance, a matching circuit (not shown) configured to be connected to each of the resonators 951 and 952 to perform impedance matching, and a rectifier (not shown) configured to rectify power input through the matching circuit. The resonators 951 and 952 may be formed in a manner that allows magnetic fields respectively generated by the resonators 951 and 952 to be excited in the same direction and in phase. To this end, current may flow in the same direction in the resonators 951 and 952. In addition, the resonators 951 and 952 may be connected to the matching circuit in serial or in parallel. In a case where the resonators 951 and 952 are connected to the matching circuit in parallel, cables connecting the matching circuit to each of the resonators 951 and 952 may have the same length.

In this case, a wireless power transmitting apparatus 900 may include a single resonator 901, and the resonator 901 may transmit power to the resonators 951 and 952.

Figure 10:
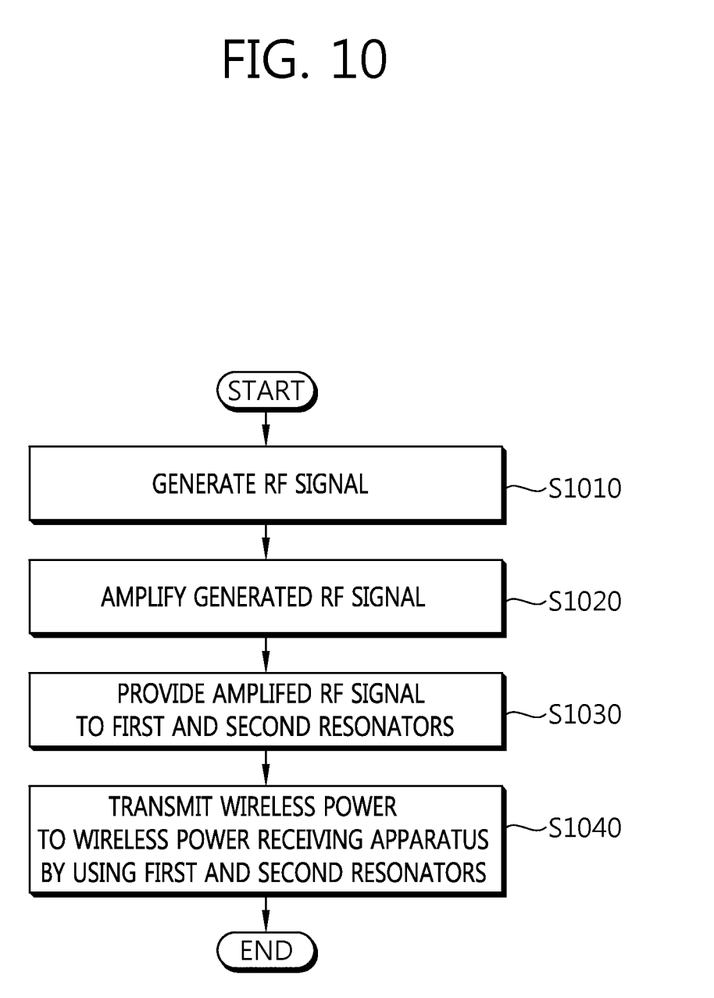
FIG. 10 is a flowchart illustrating a wireless power transmitting method according to an exemplary embodiment of the present invention.

FIG. 10 is a flowchart illustrating a wireless power transmission method according to an exemplary embodiment of the present invention. Hereinafter, a wireless power transmitting method of a wireless power transmitting apparatus according to the present invention is described with reference to FIG. 10.

When a RF signal is generated by a generator of a wireless power transmitting apparatus in S1010, the RF signal is amplified by an amplifier of the wireless power transmitting apparatus in S1020. Then, the wireless power transmitting apparatus performs impedance matching on the amplified RF signal using a predetermined matching circuit in S1030, and transmits the resultant signal to the first resonator using the first feeding loop and to the second resonator using the second feeding loop in S1030. As a result, wireless power is transmitted from the first and second resonators to a wireless power receiving apparatus in S1040, and the wireless power transmitting apparatus controls a magnitude of the wireless power by exchanging information with the wireless power receiving apparatus. The first and second feeding loops may be formed in a manner that allows magnetic fields respectively generated by the first and second resonators to be excited in the same direction and in phase. To this end, current may flow in the same direction in the first and second feeding loops. In addition, a charging area is formed between the first and second resonators.

The first and second resonators may be connected to a matching circuit in parallel. In this case, the first and second feeding loops are at the same distance from a point where an RF signal is separated to be provided to the first and second feeding loops. In a case where the first and second resonators are connected to a matching circuit through a coaxial cable, the first and second resonators and the matching circuit may be connected to one another using a "T"-shaped connector. However, the first and second resonators may be connected in serial to a matching circuit that performs the impedance matching.

Figure 11:
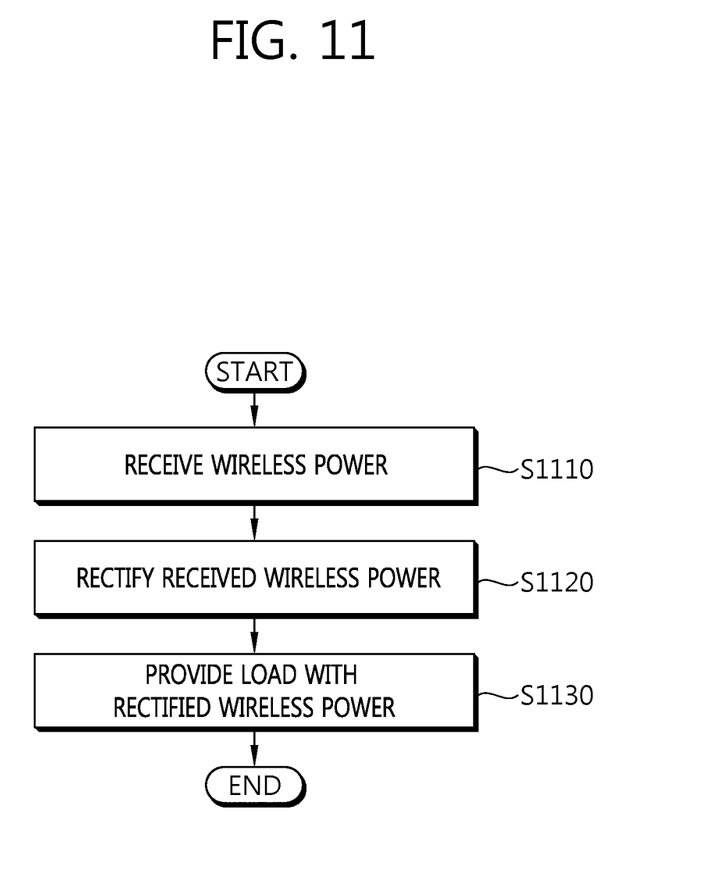
FIG. 11 is a flowchart illustrating a wireless power receiving method according to an exemplary embodiment of the present invention.

FIG. 11 is a flowchart illustrating a wireless power receiving method according to an exemplary embodiment of the present invention.

When receiving wireless power from a wireless power transmitting apparatus in S1110, a wireless power receiving apparatus rectifies the received wireless power to be usable in a load in S1120, and provides the load with the rectified wireless power in S1130. At this point, a controller of the wireless power receiving apparatus may measure current and/or voltage applied to the load and transmit, to the wireless power transmitting apparatus, information on the measured current and/or voltage.

Even in a case where a receiver coil is positioned far from a transceiver coil or where input/output (I/O) impedance for transmission and receipt is fixed, it is possible to provide high power transmission efficiency.

In addition, a wireless power receiving apparatus may have greater autonomy in position with respect to a wireless power transmitting apparatus. Furthermore, power transmission efficiency, which is reduced according to position error of the wireless power receiving apparatus, may be improved, so that power transmission is available in a much wider area.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A wireless power transmitting apparatus comprising:
a generator configured to generate a Radio Frequency (RF) signal;
an amplifier configured to amplify the generated RF signal;
a matching circuit configured to be connected to the amplifier to perform impedance matching;
a first resonator configured to comprise a first feeding loop connected to the matching circuit and transmit wireless power using a signal provided through the first feeding loop; and
a second resonator configured to comprise a second feeding loop connected to the matching circuit and transmit wireless power using a signal provided through the second feeding loop,
wherein the first and second feeding loops are formed in a manner that allows magnetic fields respectively generated by the first and second resonators to be excited in the same direction and in phase without switch control of the first and second feeding loops.

2. The wireless power transmitting apparatus of claim 1, wherein current are flow on the same direction in the first and second feeding loops.

3. The wireless power transmitting apparatus of claim 1, wherein a charging area is formed between the first and second resonators.

4. The wireless power transmitting apparatus of claim 1, wherein the first and second resonators are connected to the matching circuit in parallel, and the first and second feeding loops are at the same distance from a point where an RF signal is separated to be provided to each of the first and second feeding loops.

5. The wireless power transmitting apparatus of claim 4, wherein the first and second resonators and the matching circuit are connected to one another using a "T"-shaped connector.

6. The wireless power transmitting apparatus of claim 1, wherein the first and second resonators are connected to the matching circuit in serial.

7. The wireless power transmitting apparatus of claim 1, wherein at least one of the first and second resonators comprises a resonant coil.

8. The wireless power transmitting apparatus of claim 1, further comprising: a controller configured to control, based on information received from a wireless power receiving apparatus, a magnitude of wireless power to be transmitted to each of the first and second resonators.

9. A wireless power transmitting method which is implemented by a wireless power transmitting apparatus, the method comprising:
generating a Radio Frequency (RF) signal;
amplifying the generated RF signal; performing impedance matching on the amplified signal;
providing a resultant signal to a first resonator using a first feeding loop and to a second resonator using a second feeding loop; and
transmitting wireless power to a wireless power receiving apparatus by using the first and second resonators,
wherein the first and second feeding loops are formed in a manner that allow magnetic fields respectively generated by the first and second resonators to be excited in the same direction and in phase without switch control of the first and second resonators.

10. The wireless power transmitting method of claim 9, wherein current flow in the same direction in the first and second feeding loops.

11. The wireless power transmitting method of claim 9, wherein a charging area is formed between the first and second resonators.

12. The wireless power transmitting method of claim 9, wherein the first and second resonators are connected in parallel to a matching circuit that performs the impedance matching, and the first and second feeding loops are at the same distance from a point where an RF signal is separated to be provided to each of the first and second feeding loops.

13. The wireless power transmitting method of claim 12, wherein the first and second resonators and the matching circuit are connected to one another using a "T"-shaped connector.

14. The wireless power transmitting method of claim 9, wherein the first and second resonators are connected in serial to a matching circuit that performs the impedance matching.

15. The wireless power transmitting method of claim 9, wherein at least one of the first and second resonators comprises a resonant coil.

16. The wireless power transmitting method of claim 9, further comprising: controlling, based on information received from a wireless power receiving apparatus, a magnitude of wireless power transmitted from each of the first and second resonators.

17. A wireless power receiving apparatus comprising:
a plurality of resonators, each configured to receive wireless power from a wireless power transmitting apparatus based on magnetic resonance;
a matching circuit configured to be connected to the plurality of resonators to perform impedance matching; and
a rectifier configured to rectify current input through the matching circuit,
wherein the plurality of resonators are formed in a manner that allows magnetic fields respectively generated by the plurality of resonators to be excited in the same direction and in phase without switch control of the plurality of resonators.

18. The wireless power receiving apparatus of claim 17, wherein current flow in the same direction in the plurality of resonators.

19. The wireless power receiving apparatus of claim 17, wherein the plurality of resonators are connected in parallel to the matching circuit, and cables connecting the matching circuit to each of the plurality of resonators have the same length.

20. The wireless power receiving apparatus of claim 17, wherein the plurality of resonators are connected to the matching circuit in serial.

* * * * *